United States Patent [19]
Nobumoto

[11] Patent Number: 5,947,861
[45] Date of Patent: Sep. 7, 1999

[54] CONTROL SYSTEM FOR A CONTINUOUSLY VARIABLE TRANSMISSION CAPABLE OF VARYING THE GEAR RATIO IN A CONTINUOUS OR STEP-WISE MANNER

[75] Inventor: Hidetoshi Nobumoto, Higashihiroshima, Japan

[73] Assignee: Mazda Motor Corporation, Hiroshima, Japan

[21] Appl. No.: 08/741,765

[22] Filed: Nov. 5, 1996

[30] Foreign Application Priority Data

Nov. 7, 1995 [JP] Japan .................................. 7-288346

[51] Int. Cl.⁶ ........................................ F16H 61/00
[52] U.S. Cl. ................... 477/37; 477/46; 477/48
[58] Field of Search .................... 477/37, 46, 48; 701/55, 56, 58

[56] References Cited

U.S. PATENT DOCUMENTS

| | | | |
|---|---|---|---|
| 4,653,005 | 3/1987 | Osanai et al. | 477/48 X |
| 4,836,056 | 6/1989 | Nakawaki et al. | 477/39 |
| 5,609,544 | 3/1997 | Lardy et al. | 477/46 |
| 5,624,348 | 4/1997 | Lardy et al. | 477/46 |

FOREIGN PATENT DOCUMENTS

| | | | |
|---|---|---|---|
| 360044651 | 3/1985 | Japan | 477/46 |
| 403204465 | 9/1991 | Japan | 477/46 |
| 5-332426 | 12/1993 | Japan . | |
| 406081939 | 3/1994 | Japan | 477/46 |

*Primary Examiner*—Tamara L. Graysay
*Assistant Examiner*—William C Joyce
*Attorney, Agent, or Firm*—Sixbey, Friedman, Leedom & Ferguson, P.C.; Donald R. Studebaker

[57] ABSTRACT

A continuously variable transmission control system employs a gear ratio control map which has a step-wise control zone of driving condition where engine speed is controlled to repeat alternate gradual increase and rapid decrease with an increase in vehicle speed so as thereby to vary step-wise a gear ratio and a continuous control zone of driving conditions where engine speed is controlled to increase approximately linearly with an increase in vehicle speed so as thereby to continuously vary a gear ratio, the step-wise control zone of driving condition based on which the gear ratio control is performed being narrowed when a driving condition is judged to be within a specified unstable zone.

23 Claims, 14 Drawing Sheets

MAP A    Stepwise Gear Ratio Control Map

MAP B   Combined Gear Ratio Control Map

MAP C  Combined Gear Ratio Control Map

MAP D  Combined Gear Ratio Control Map

CONTROL SYSTEM FOR A CONTINUOUSLY VARIABLE TRANSMISSION CAPABLE OF VARYING THE GEAR RATIO IN A CONTINUOUS OR STEP-WISE MANNER

BACKGROUND OF THE INVENTION

1. Field of the Invention

The present invention relates to a control system for a continuously variable automatic transmission, and, more particularly, to a continuously variable automatic transmission control system which controls a gear ratio of a continuously variable automatic transmission according to vehicle driving conditions.

2. Description of Related Art

Typically, continuously variable automatic transmissions are controlled so as to vary its gear ratio by use of gear ratio control maps selected according to vehicle driving conditions. Such a gear ratio control map for the continuously variable automatic transmission defines engine speed control curves for specific engine throttle openings, each of the engine speed control curves specifies a target engine speed according to vehicle speeds. With the gear ratio control maps, the target engine speed is controlled to sharply increase so that the engine generates a great amount of driving torque when the engine throttle opening is relatively large and, on the other hand, is controlled to show a gentle increase so as to improve fuel efficiency when the engine throttle opening is relatively small.

In cases where the transmission gear ratio control is performed by use of the gear ratio control maps, when the engine throttle is fully opened with driver's intention of rapid acceleration, the target gear ratio is set to a maximum gear ratio so that the gear ratio is gradually decreased to increase the speed of vehicle after the engine speed has risen up to the greatest speed in a zone of lower vehicle speeds. This gear ratio control in which an increase in vehicle speed is caused without being accompanied by a change in engine speed makes the driver have a feeling of inept acceleration.

In order for continuously variable automatic transmission of this kind to perform gear ratio control with a result of causing inept acceleration, it has been proposed in, for instance Japanese Unexamined Patent Publication No. 5-332426, to cause a step-wise change in gear ratio by means of repeating alternate gradual increase and rapid decrease in engine speed to increase vehicle speed. This gear ratio control provides a pleasant sensation of driving, such as sporty and light driving sensations, when the engine throttle opening is greater than a specified value. The step-wise gear ratio change possibly occur even during unstable driving, for example driving on a steep slope, turning a corner, driving with greater lateral acceleration, driving with greater longitudinal acceleration, or driving on a road whose surface frictional coefficient is low.

SUMMARY OF THE INVENTION

It is an object of the present invention to provide a gear ratio control system for a continuously variable transmission which provides gear ratio control suitably for both stability of driving and pleasant sensation of driving, such as a feeling of sporty and light driving, when the engine throttle opening is greater.

According to an embodiment of the invention, a continuously variable transmission control system employs a gear ratio control map which has a step-wise control zone of driving condition where engine speed is controlled to repeat alternate gradual increase and rapid decrease with an increase in vehicle speed so as thereby to vary step-wise a gear ratio and a continuous control zone of driving conditions where engine speed is controlled to increase approximately linearly with an increase in vehicle speed so as thereby to continuously vary a gear ratio. When a driving condition is judged to be within a specified unstable zone, the gear ratio control system narrows the step-wise control zone of driving condition based on which the gear ratio control is performed, or otherwise interrupts the gear ratio control based on the step-wise control zone of driving condition.

The gear ratio control system may change a specified engine throttle opening to a smaller level as a boundary at which the gear ratio control map is divided into the step-wise control zone of driving conditions and the continuous control zone of driving conditions to narrow the step-wise control zones of driving conditions when the driving condition is judged to be within the specified unstable zone. Driving condition may be judged to be unstable when a slope of a road on which the vehicle is running is greater than a specified slope, when a steering angle is greater than a specified angle, when lateral acceleration of the vehicle is greater than a specified level, when a road surface frictional coefficient of a road on which the vehicle is running is less than a specified level, or when longitudinal acceleration of the vehicle is greater than a specified level.

With the continuously variable automatic transmission control system, steady driving of the vehicle is ensured by changing the step-wise control zone of driving conditions even when a driving condition is within the specified unstable zone.

According to another embodiment of the invention, a continuously variable transmission control system employs a step-wise gear ratio control map for controlling engine speed to increase with increases in vehicle speed and engine throttle opening so as thereby to step-wise vary a gear ratio, and a continuous gear ratio control map for controlling engine speed to increase with an increase in vehicle speed so as thereby to continuously vary a gear ratio. The control system selects and uses the step-wise gear ratio control map when a changing rate of throttle opening is equal to or less than a specified rate or the continuous gear ratio control map when the changing rate is greater than the specified rate.

With the continuously variable automatic transmission control system, vehicle speed control is performed corresponding to operation of an accelerator pedal.

BRIEF DESCRIPTION OF THE DRAWINGS

The above and other objects and features of the present invention will be clearly understood from the following description with respect to a preferred embodiment thereof when considered in conjunction with the accompanying drawings, in which.

DETAILED DESCRIPTION OF THE PREFERRED EMBODIMENTS

Figure 1:
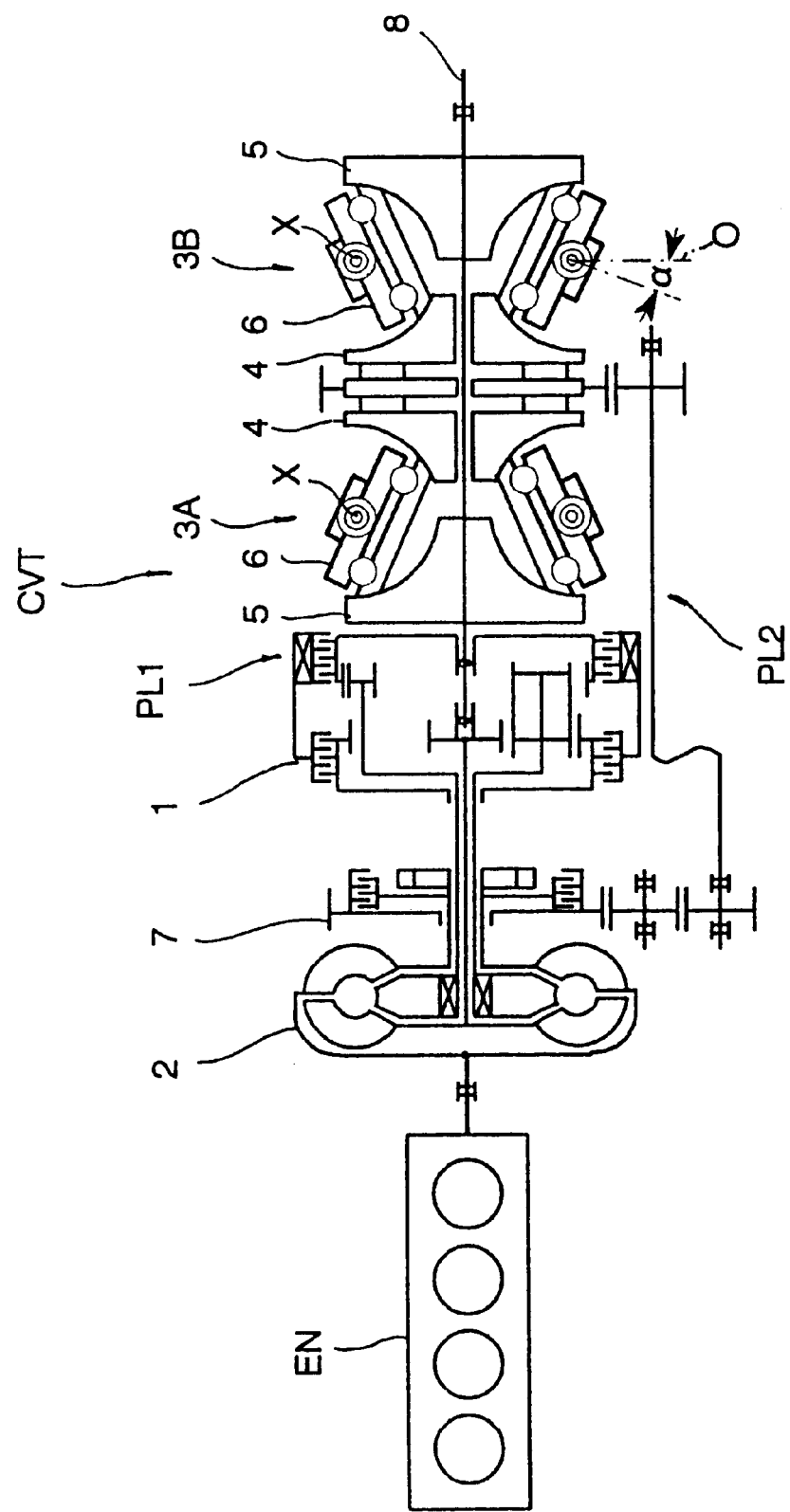
FIG. 1 is a skeleton diagram showing a toroidal type continuously variable transmission equipped with a transmission control system in accordance with a specific embodiment of the invention.
Figure 2:
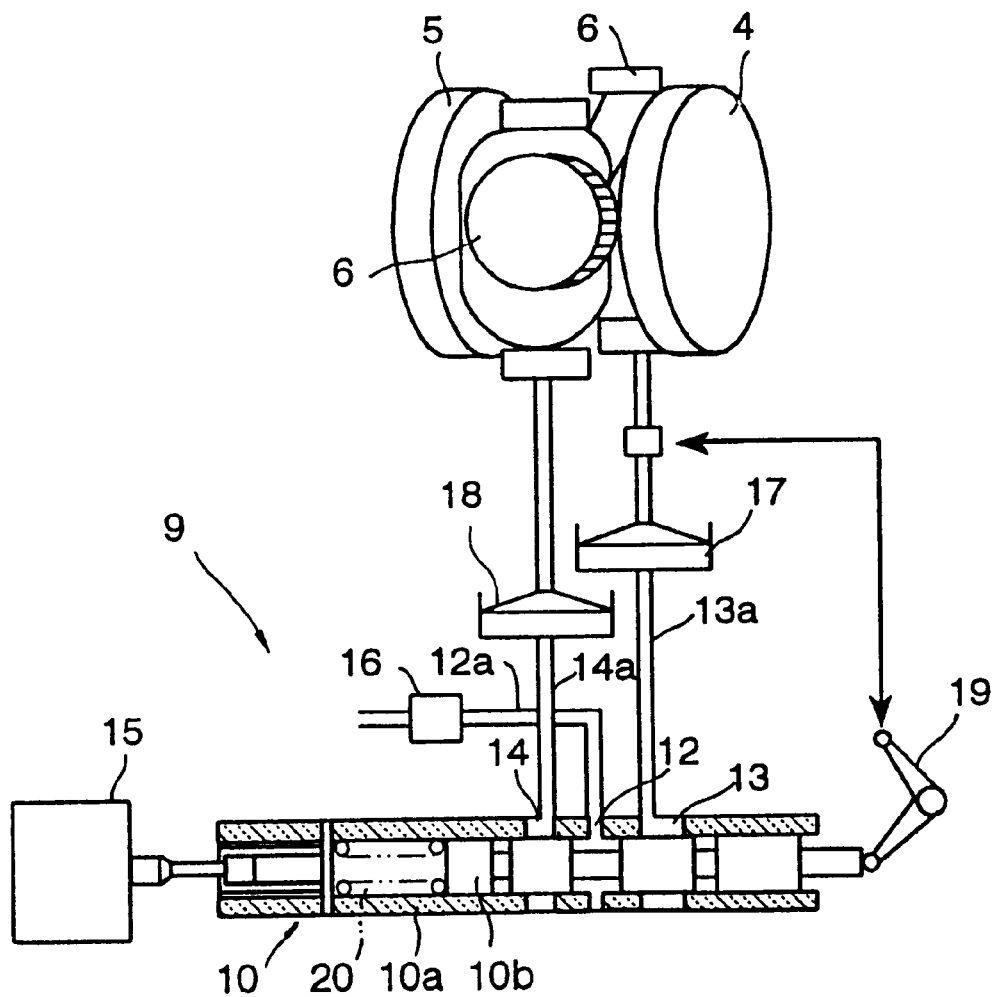
FIG. 2 is a shift mechanism of the toroidal type continuously variable transmission of FIG. 1.

Referring to the drawings in detail, in particular, to FIGS. 1 and 2, a toroidal type of continuously variable automatic transmission (which is hereafter referred to as an automatic transmission for simplicity) CVT equipped with a control system of the invention has a planetary gear unit 1 and a pair of toroidal transmission units 3A and 3B incorporated therein and is connected to an engine EN through a torque converter 2. Each of the toroidal transmission units 3A and 3B comprises an input disk 4 mounted for rotation on a transmission output shaft 8, an output disk 5 secured to the transmission output shaft 8, and a pair of rollers 6 held in frictional contact with opposing toroidal surfaces of the input and output disks 4 and 5 to transmit torque between the input and output disks 4 and 5. The automatic transmission CVT has two torque transmission paths, namely a first torque transmission path PL1 in a manual select mode selected by a control mode select switch 31 (see FIG. 3) and a second torque transmission path PL2 in an automatic select mode selected by the control mode select switch 31.

Gear ratio of the automatic transmission CVT is controlled by tilting the rollers 6 with respect to a vertical line O perpendicular to an axis of rotation X of the roller 6 which is caused by means of a control valve mechanism 9. This valve mechanism 9 includes a control valve 10 and a stepping motor 15. The control valve 10 comprises a cylindrical sleeve 10a axially movable in a valve casing (not shown) and a spring loaded spool 10b received in and movable relative to the sleeve 10a. The sleeve 10a is formed with an inlet 12 and outlets 13 and 13 positioned on axially opposite sides of the inlet 12. Hydraulic line pressure is supplied to the control valve 10 through a pressure line 12a provided with a pressure level regulator valve 16. The stepping motor 15 axially shifts the sleeve 10a to communicate the inlet 12 selectively with these outlets 13 and 14. The relative position between the spool 10b and pistons 17 and 18 are adjusted by means of a cooperative effect of a rink 19 and a spring 20.

Hydraulically operated pistons 17 and 18 for causing tilting motion of the roller 6 are supplied with hydraulic pressure from the valve mechanism 9 through pressure lines 13a and 14a, respectively. The gear ratio of automatic transmission CVT is determined according to tilted angles α of the rollers 6 (see FIG. 1) with respect to the vertical line O.

Figure 3:
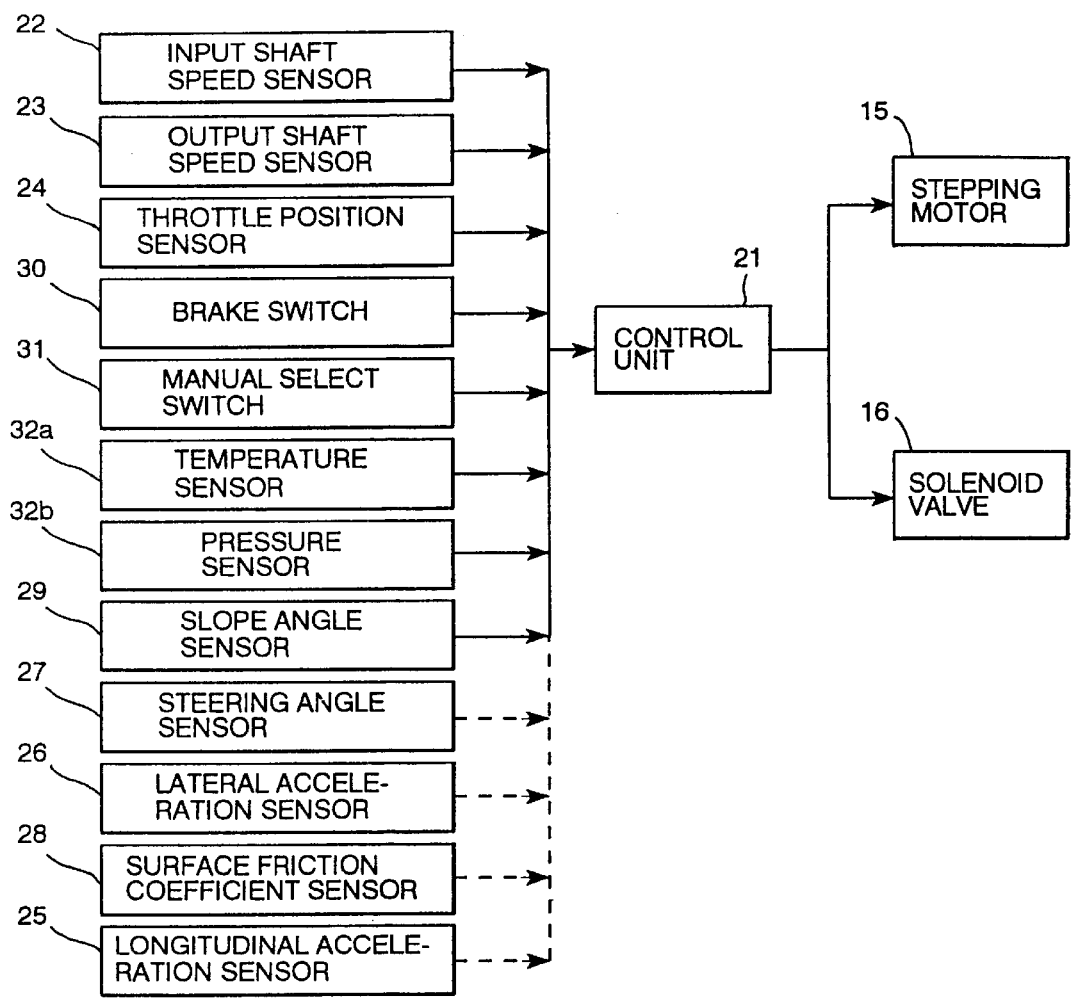
FIG. 3 is a block diagram of the transmission control system.
Figure 4:
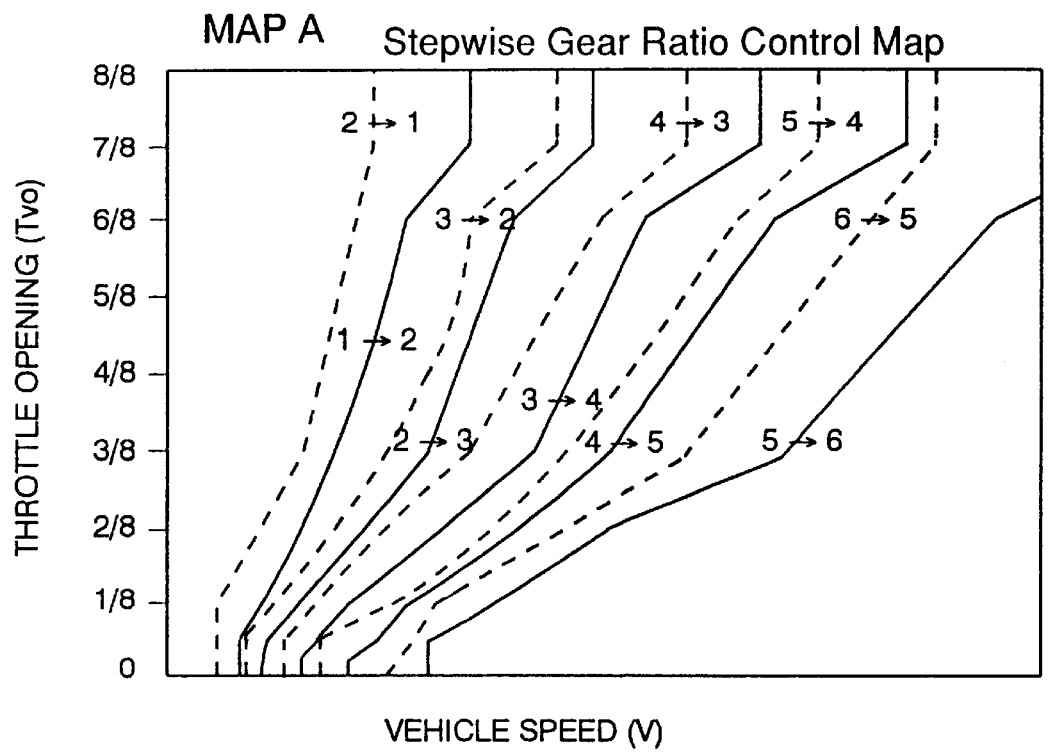
FIG. 4 is an illustration of a step-wise gear ratio control map.
Figure 5:
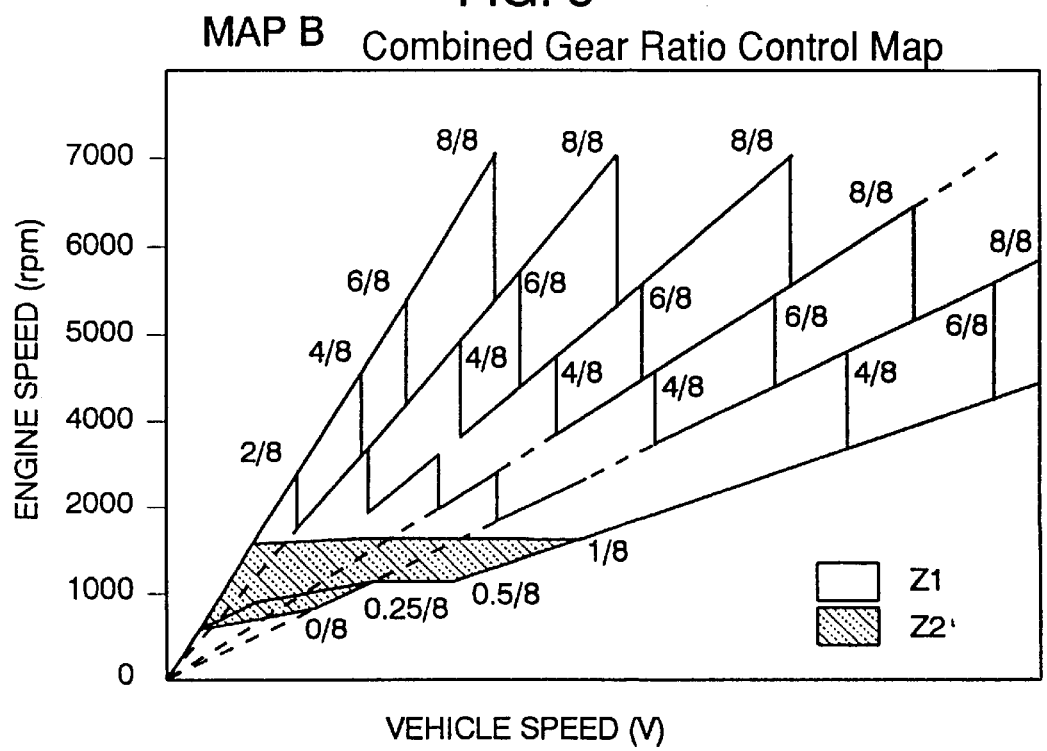
FIG. 5 is an illustration of a combined gear ratio control map.
Figure 6:
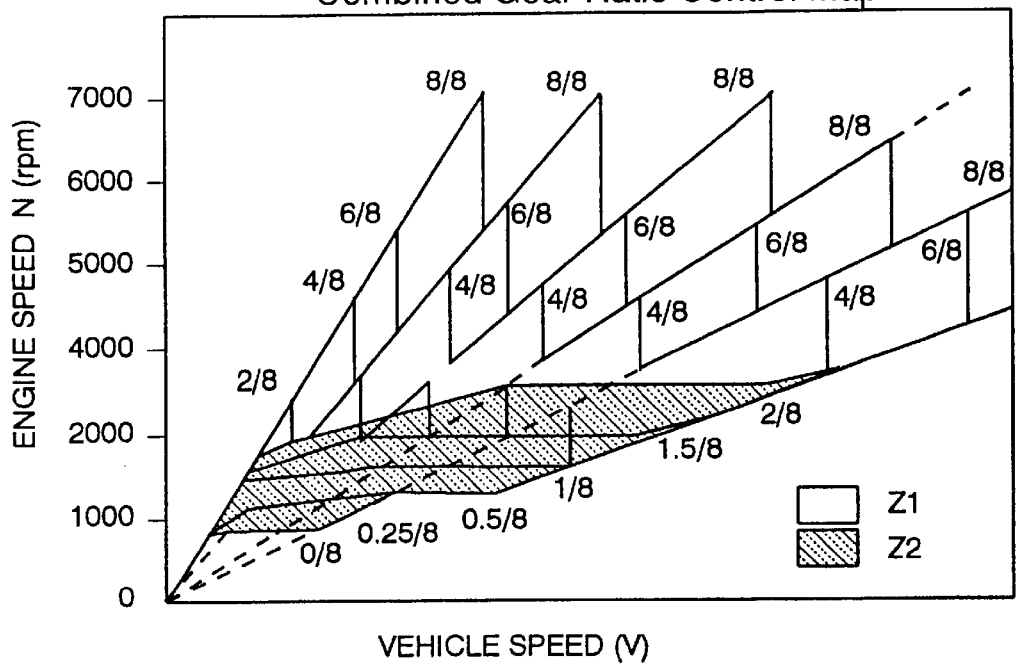
FIG. 6 is an illustration of another combined gear ratio control map.
Figure 7:
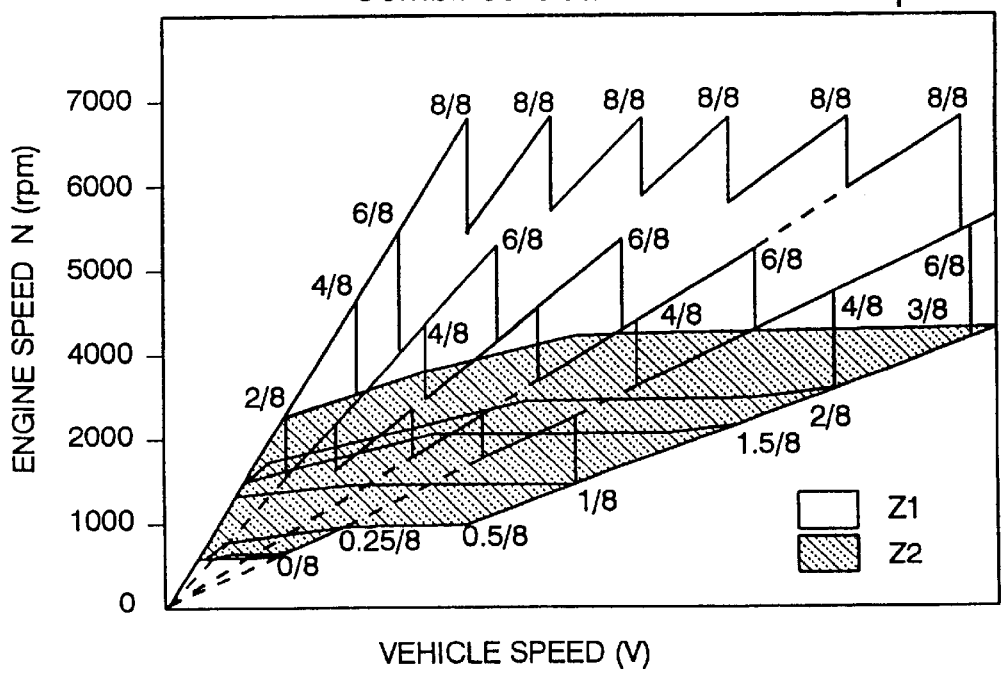
FIG. 7 is an illustration of still another combined gear ratio control map.
Figure 8:
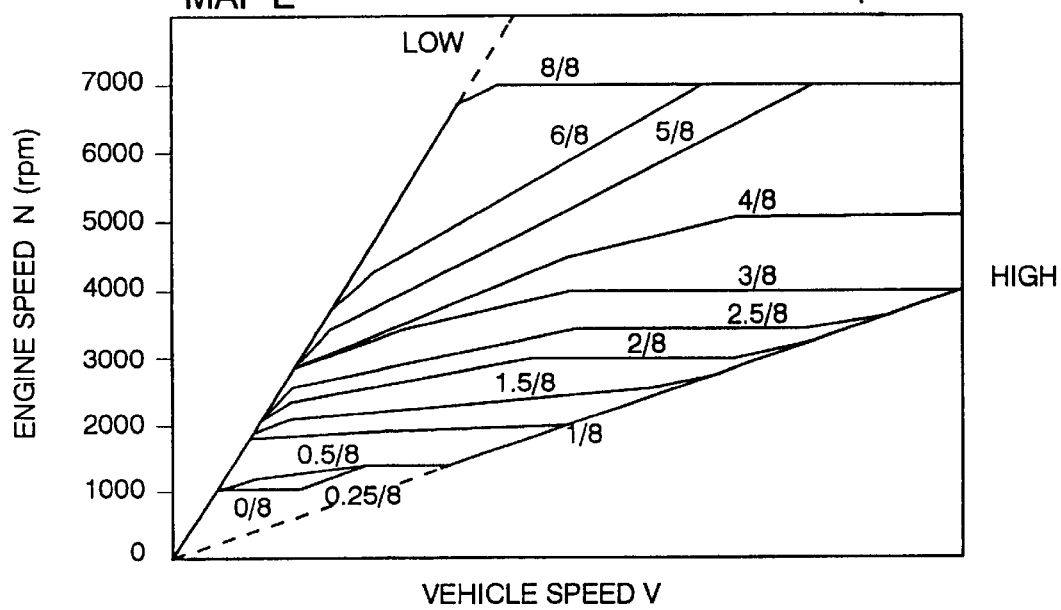
FIG. 8 is an illustration of a continuous gear ratio control map.

As shown in FIG. 3, a control unit 21 of the transmission control system in accordance with an embodiment of the invention controls the stepping motor 15 and the regulator valve 16 on the basis of various control parameters such as engine speed N, vehicle speed V, engine throttle opening Tvo, longitudinal acceleration Gx, lateral acceleration Gy, steering angle φ, road surface frictional coefficient μ, road slope angle θ, etc. In order to provide these control parameters in the form of electric signals, there are installed various sensors, namely a speed sensor 22 for detecting a rotational speed N of the engine EN, a speed sensor 23 for detecting a rotational speed of the transmission output shaft 8 as a vehicle speed V, a position sensor 24 for detecting engine throttle opening Tvo, acceleration sensors 25 and 26 for detecting a longitudinal acceleration Gx and a lateral acceleration Gy, respectively, an angle sensor 27 for detecting a steering angle φ of a steering wheel, a friction sensor 28 for detecting a frictional coefficient μ of a road surface, and an angle sensor 29 for detecting a slope angle θ of a road. The control unit 21 is further provided with a brake switch 30 which is turned on when brake is applied, a temperature sensor 32a for detecting a temperature of hydraulic oil and a pressure sensor 32b for detecting a line pressure level.

Data of transmission gear ratio control maps A through E, such as shown in FIGS. 4 through 8, are previously stored in the control unit 21 and selectively retrieved to cause the automatic transmission CVT to perform a proper gear shift or provide a proper transmission gear ratio according to a vehicle driving condition.

Gear ratio control map A defines various patterns of gear ratio changes according to vehicle speeds V and engine throttle openings Tvo. Each of the gear ratio control maps B to D has two control zones of driving conditions, namely a first or step-wise control zone Z1 where the gear ratio control map defines patterns of step-wise gear ratio changes so as to repeatedly cause alternate gradual increase and rapid decrease in engine speed N as the vehicle speed V increases and a second or continuous control zone Z2 where the gear ratio control map defines a change in transmission gear ratio so as to cause a continuous and gradual change in engine speed N as the vehicle speed V increases. It is noted that, in the specification, the first and second zones Z1 and Z2 are hereafter referred to as a step-wise control zone and a continuous control zone, respectively. The gear ratio control map E defines various patterns of changes in transmission gear ratio so as to cause a continuous change in engine speed N as the vehicle speed V increases. In each of the gear ratio control maps B, C and D, the step-wise control zone Z1 includes engine throttle openings Tvo greater than a critical engine throttle opening Tvos, and the continuous control zone Z2 includes engine throttle openings Tvo less than the critical engine throttle opening Tvos. This critical engine throttle opening Tvos is differed according to the maps, namely ⅛ for the gear ratio control map B, ⅔ for the gear ratio control map C, and ⅜ for the gear ratio control map D. These step-wise control zone Z1 and continuous control zone Z2 are overlapped at boundary sections as a transitional zone. Each gear ratio control pattern of the gear ratio control map B, C, D is programmed to cause a gear shift to a higher gear as the engine throttle opening Tvo becomes greater in the step-wise control zone Z1.

In the transmission control, the step-wise control zone Z1 is altered by selecting an appropriate one of the gear ratio control maps B, C and D according to unstable driving conditions which are judged based on control parameters such as road slope angle $\theta$, road surface frictional coefficient $\mu$, longitudinal acceleration Gx, and steering angle $\phi$ or lateral acceleration Gy.

Figure 9:
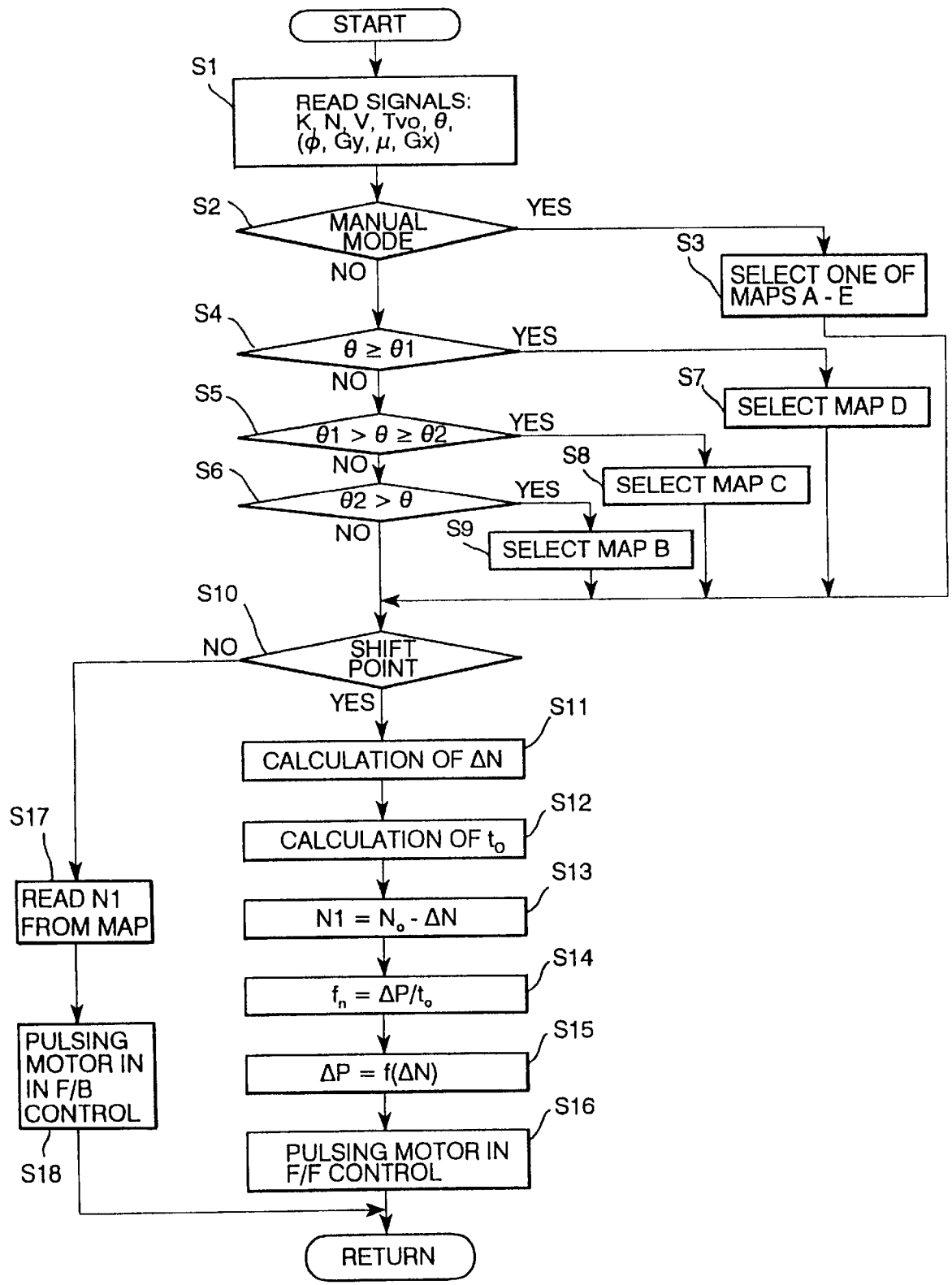
FIG. 9 is a flow chart illustrating a gear ratio control sequence routine for a microcomputer of a control unit.

FIG. 9 is a flow chart illustrating the transmission control sequence routine for the control unit 21 in which driving conditions are judged to be stable or unstable according to road slope angles $\theta$. The flow chart logic commences and control passes directly to function block at step S1 where various control parameters such as engine speed N, vehicle speed V, engine throttle opening Tvo, longitudinal acceleration Gx, lateral acceleration Gy, steering angle $\phi$, road surface frictional coefficient $\mu$ and road slope angle $\theta$ are read into the control unit 21 based on signals from the sensors and switches 25–31. These sensors and switches 25–31 per se are well known to those skilled in the art and take any known types. Further, at step S1, a signal K is read in if the manual elect switch 31 is operated. A determination is made at step S2 as to whether the manual select switch 31 has been operated to selects either one of the gear ratio control maps A–E. If the answer to the decision is affirmative, the selected one of the gear ratio control maps A–E is used at step S3. If the manual select switch 31 is not operated and selects an automatic select mode, the gear ratio control maps B, C and D are automatically selected according to road slope angles $\theta$. Specifically, determinations are made at steps S4 through S6 as to whether the road slope angle $\theta$ is greater than an upper critical angle $\theta 1$, less than the upper critical angle $\theta 1$ but greater than a lower critical angle $\theta 2$, or less than the lower critical angle $\theta 2$, respectively. If the road slope angle $\theta$ is greater than the upper critical angle $\theta 1$ as a result of the determination made at step S4, the gear ratio control map D is selected at step S7. If the road slope angle $\theta$ is between the upper and lower critical angles $\theta 1$ and $\theta 2$ as a result of the determination made at step S5, the gear ratio control map C is selected at step S8. Further, if the road slope angle $\theta$ is less than the lower critical angle $\theta 2$ as a result of the determination made at step S6, the gear ratio control map B is selected at step S9. Through this automatic selection of the gear ratio control maps B, C and D, the step-wise control zone Z1 is altered to be narrower with an increase in the road slope angle $\theta$ which provides aggravation of driving stability. Whenever any one of the gear ratio control maps A to D is either manually or automatically selected, a determination is made at step S10 as to whether the driving condition is at a step-wise control point. If the driving condition is at a step-wise control point within the step-wise control zone, a calculation of a change in engine speed $\Delta N$ is performed based on an engine throttle opening Tvo and a throttle opening changing rate dTvo at step S11.

Figure 13:
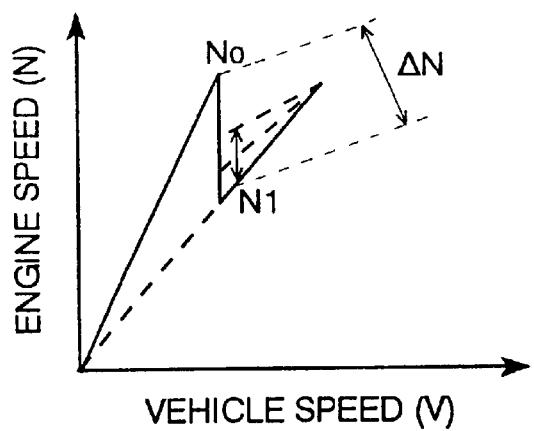
FIG. 13 is a diagram showing a relationship between vehicle speed and engine speed during a change in gear ratio.
Figure 14:
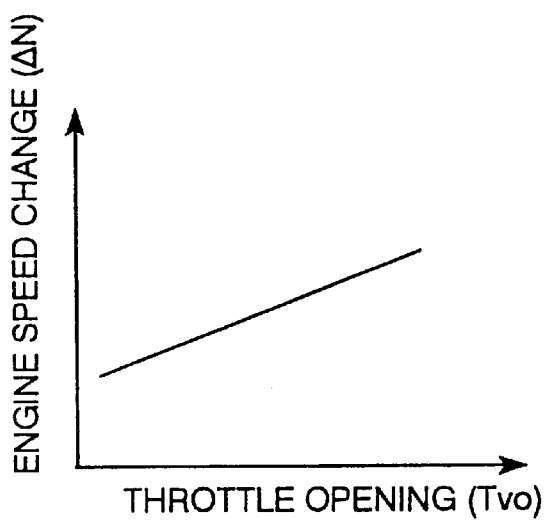
FIG. 14 is a diagram showing a relationship between engine throttle opening and engine speed change during a change in gear ratio.
Figure 15:
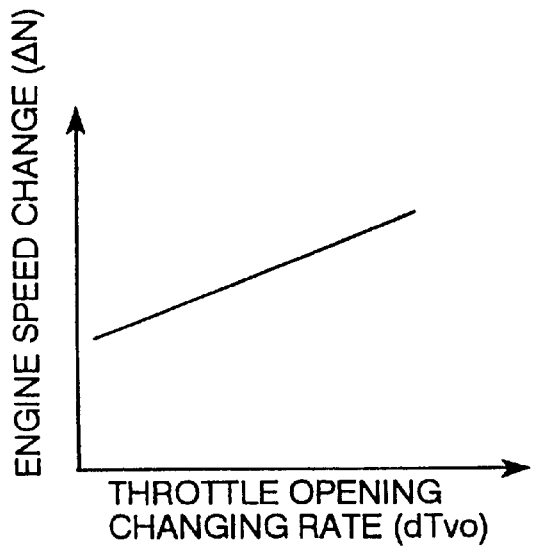
FIG. 15 is a diagram showing a relationship between changing rate of engine throttle opening and engine speed change during a change in gear ratio.

As shown in FIGS. 13 through 15, during a gear control in the step-wise control zone Z1 where the engine speed N quickly changes from No to N1, the engine EN is controlled to increase the engine speed change $\Delta N$ as both of the throttle opening Tvo and throttle opening changing rate dTvo become greater so that the engine EN creates sound pleasant for the driver who is trying sporting driving.

Figure 16:
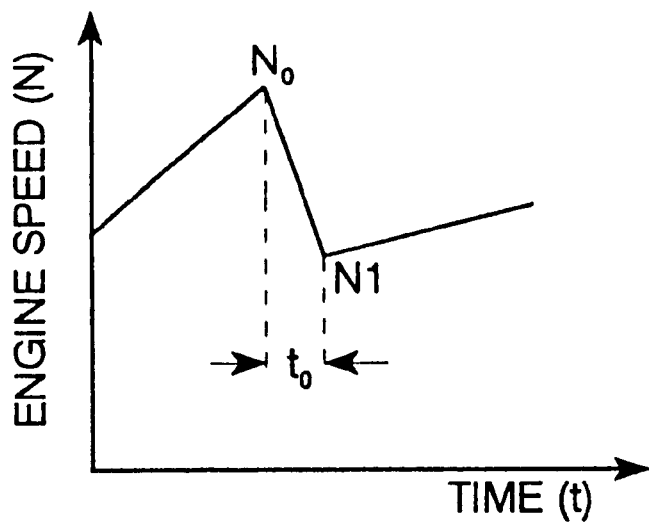
FIG. 16 is a diagram showing a relationship between shift time and engine speed during a change in gear ratio.
Figure 17:
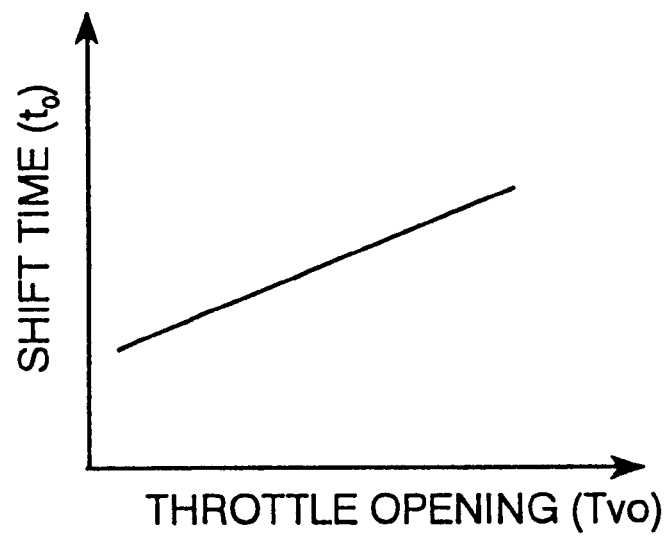
FIG. 17 is a diagram showing a relationship between shift time and engine throttle opening during a change in gear ratio.
Figure 18:
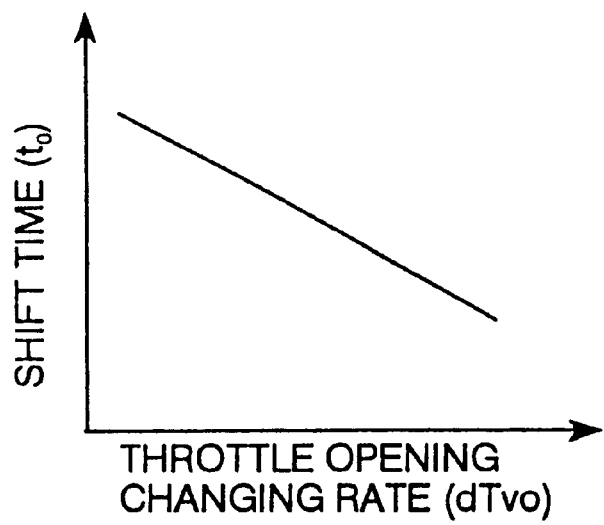
FIG. 18 is a diagram showing a relationship between shift time and changing rate of engine throttle opening during a change in gear ratio.

Next, a calculation of a shift time $t_o$ necessary for the engine EN to change its speed N from No to N1 is performed based on the throttle opening Tvo and throttle opening changing rate dTvo at step S12. Specifically, as shown in FIGS. 16 through 18, the shift time $t_o$ is altered, on one hand, to be longer as the engine throttle opening Tvo increases, lowering shift shock caused due to high input torque transmitted to the automatic transmission CVT and on the other hand, to be shorter as the throttle opening changing rate dTvo increases, enabling a quick gear shift so that the driver is trying to enjoy lively driving even admitting gear shift shock a little.

Figure 19:
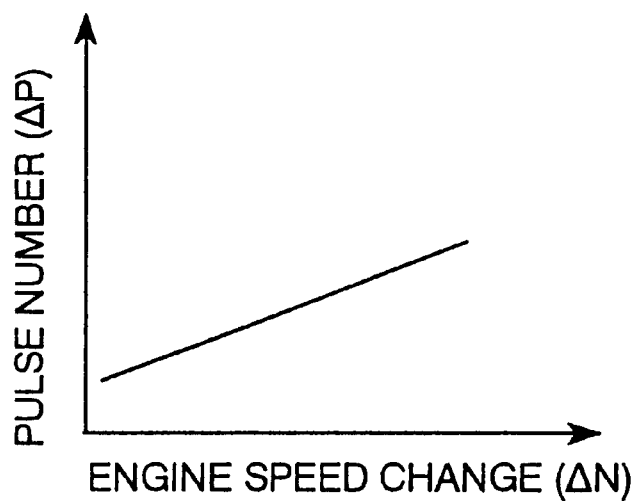
FIG. 19 is a diagram showing a relationship between engine speed change and drive pulse number.

Subsequently, calculations of a target engine speed Nt and number of pulse $\Delta P$ are calculated at steps S13 and S14, respectively. The target engine speed Nt is given as a difference between an engine speed No and an engine speed change $\Delta N$. The number of pulses $\Delta P$ with which the stepping motor 15 is driven is given by a linear function of engine speed change $\Delta N$ as shown in FIG. 19. After calculation of a driving frequency fo is made based on the number of pulses $\Delta P$ and the shift time $t_o$ at step S15, the pulse motor 15 is pulsed in feed-forward control at step S16.

Whenever the answer to the decision made at step S10 is negative, after determining a target engine speed Nt based on the gear ratio control map at step S17, the pulse motor 15 is pulsed in feedback control at step S18.

As described above, as the road slope angle $\theta$ becomes greater beyond the critical angles $\theta 1$ or $\theta 2$, in other words, as driving conditions become more unstable, the step-wise control zone Z1 is altered to be narrower, and conversely, the continuous control zone Z2 is altered to be wider. Consequently, a zone of driving conditions where the gear ratio is changed by repeating an alternate gradual increase and rapid decrease in engine speed N is narrowed for smaller road slope angles $\theta$, and a zone of driving conditions where the gear ratio is continuously changed at a fixed rate is broadened for greater road slope angles $\theta$. As a result, sporting and lively driving is realized as well as stable driving.

Figure 10:
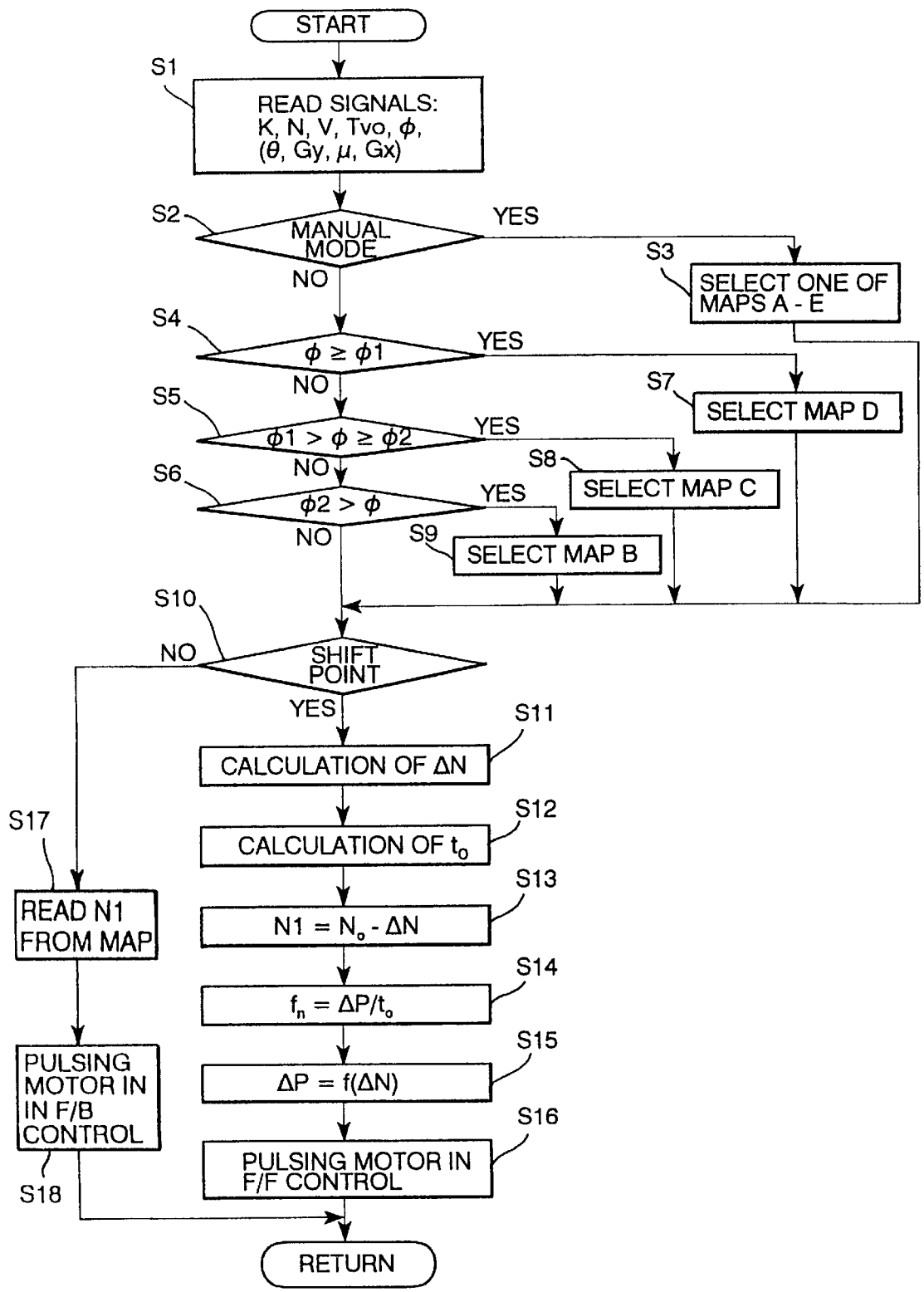
FIG. 10 is a variation of the flow chart illustrating the gear ratio control sequence routine of FIG. 9.

The stability of driving conditions may be judged according to steering angles $\phi$ in place of road slope angles $\theta$ as shown in FIG. 10 which shows a flow chart illustrating a variation of the transmission control sequence routine. Since steps S1 to S3 and S10 through S18 in the flow chart of the transmission control sequence routine shown in FIG. 10 are just the same as those in the flow chart of the transmission control sequence routine shown in FIG. 9, the following description is directed only to steps S4 through S9. In flow chart of the transmission control sequence routine shown in FIG. 10, determinations are made at steps S4 through S6 as to whether the steering angle $\phi$ is greater than an upper critical angle $\phi 1$, less than the upper critical angle $\phi 1$ but greater than a lower critical angle $\phi 2$, or less than the lower critical angle $\phi 2$, respectively. If the steering angle $\phi$ is greater than the upper critical angle $\phi 1$, the gear ratio control map D is selected at step S7. If the steering angle $\phi$ is between the upper and lower critical angles φ1 and φ2, the gear ratio control map C is selected at step S8. Further, if the steering angle φ is less than the lower critical angle φ2, the gear ratio control map B is selected at step S9.

Through this automatic selection of the gear ratio control maps B, C and D, the step-wise control zone Z1 is altered to be narrower with an increase in the steering angle φ which also provides aggravation of driving stability.

In this variation where steering angles φ are examined to judge the stability of driving conditions, as the steering angle φ becomes greater beyond the critical angles φ1 or φ2 with the result of aggravation of the stability of driving, the step-wise control zone Z1 is altered to be narrower, and the continuous control zone Z2 is conversely altered to be wider. Consequently, a zone of driving conditions where the gear ratio is changed by repeating an alternate gradual increase and rapid decrease in engine speed N is narrowed for smaller steering angles φ, and a zone of driving conditions where the gear ratio is continuously changed at a fixed rate is broadened for greater steering angles φ. As a result, sporting and lively driving is realized as well as stable driving. In particular, because shift shock during cornering is suppressed, improved stable drivability is yielded. The lateral acceleration Gy, Gy1 and Gy2 may be simply substituted for the steering angles φ, φ1 and φ2.

Figure 11:
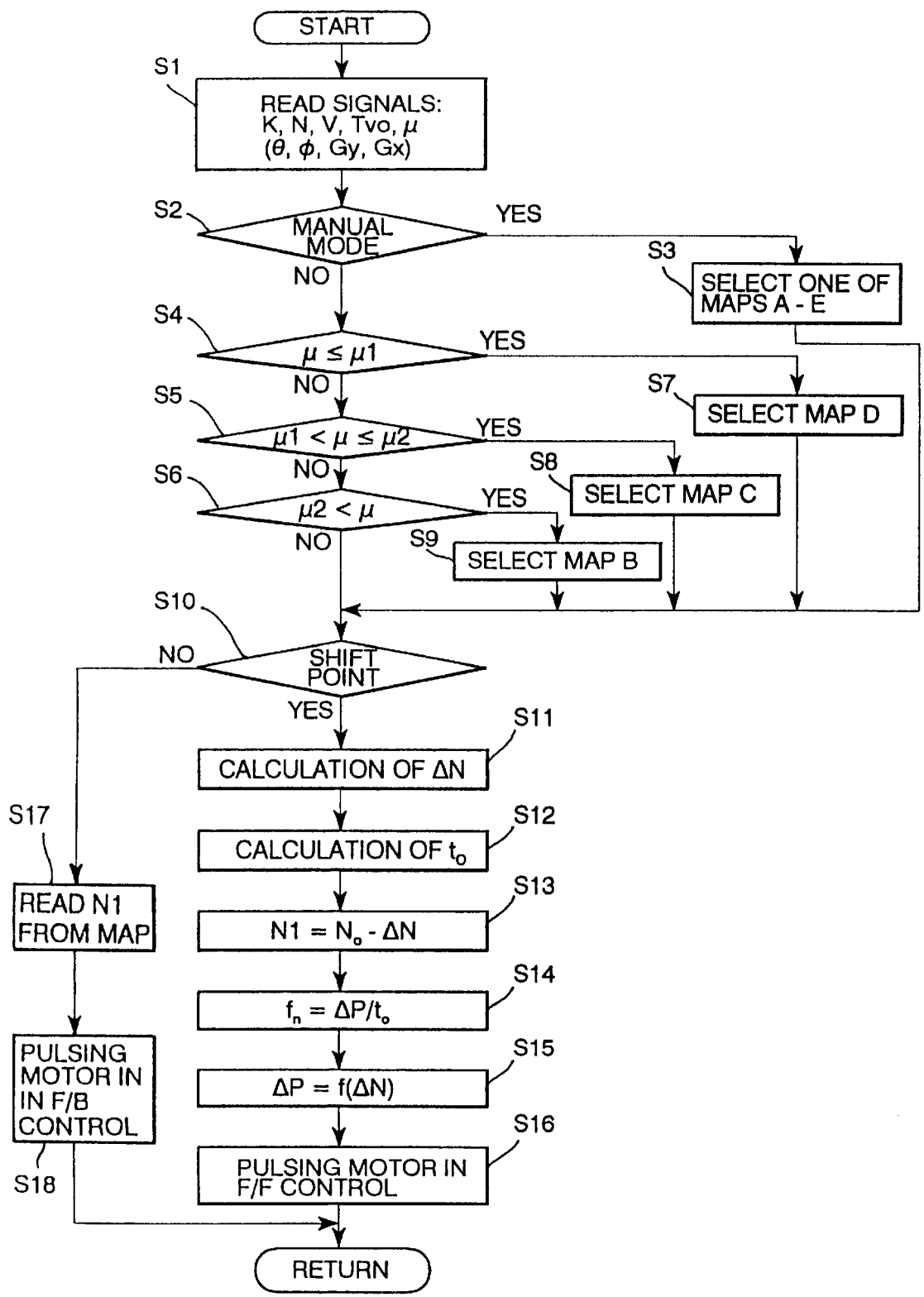
FIG. 11 is another variation of the flow chart illustrating the gear ratio control sequence routine of FIG. 9.

The stability of driving conditions may be judged according to road surface frictional coefficients μ in place of road slope angles θ as shown in FIG. 11.

In the flow chart of the transmission control sequence routine shown in FIG. 11, the stability of driving conditions is judged according to road surface frictional coefficients μ. That is, determinations are made at steps S4 through S6 as to whether the road surface frictional coefficient μ is greater than an upper critical frictional coefficient μ1, less than the upper critical frictional coefficient μ1 but greater than a lower critical frictional coefficient μ2, or less than the lower critical frictional coefficient μ2, respectively. If the road surface frictional coefficient μ is greater than the upper critical frictional coefficient μ1, the gear ratio control map D is selected at step S7. If the road surface frictional coefficients μ is between the upper and lower critical frictional coefficients μ1 and μ2, the gear ratio control map C is selected at step S8. Further, if the road surface frictional coefficient μ is less than the lower critical frictional coefficient μ2, the gear ratio control map B is selected at step S9. Through this automatic selection of the gear ratio control maps B, C and D, the step-wise control zone Z1 is altered to be narrower with an increase in the road surface frictional coefficients μ which also provides aggravation of driving stability. Since steps S1 to S3 and S10 through S18 in the flow chart of the transmission control sequence routine shown in FIG. 11 are just the same as those in the flow chart of the transmission control sequence routine shown in FIG. 9, a description regarding steps S1 to S3 and S10 through S18 is omitted for avoiding redundancy.

In this variation where road surface frictional coefficients μ are examined to judge the stability of driving conditions as the road surface frictional coefficient μ becomes greater beyond the critical frictional coefficients μ1 or μ2 with the result of aggravation of the stability of driving, the step-wise control zone Z1 is altered to be narrower, and the continuous control zone Z2 is conversely altered to be wider. Consequently, a zone of driving conditions where the gear ratio is changed by repeating an alternate gradual increase and rapid decrease in engine speed N is narrowed for smaller road surface frictional coefficients μ, and a zone of driving conditions where the gear ratio is continuously changed at a fixed rate is broadened for greater road surface frictional coefficients μ. As a result, sporting and lively driving is realized as well as stable driving. In particular, because shift shock during cornering is suppressed, improved stable drivability is yielded.

Figure 12:
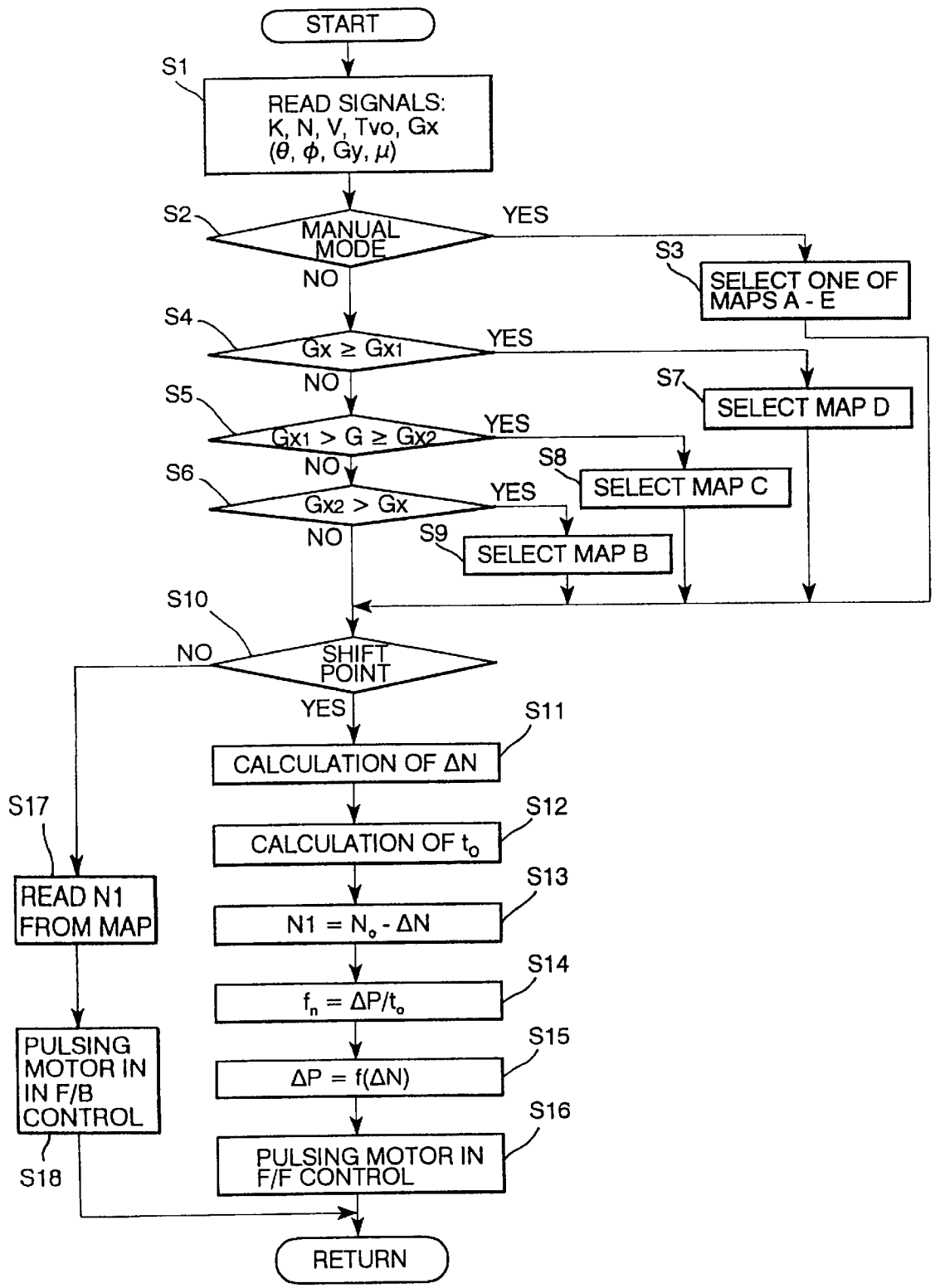
FIG. 12 is still another variation of the flow chart illustrating the gear ratio control sequence routine of FIG. 9.

The stability of driving conditions may be judged according to longitudinal acceleration Gx in place of road slope angles θ as shown in FIG. 12. Since steps S1 to S3 and S10 through S18 in the flow chart of the transmission control sequence routine shown in FIG. 12 are just the same as those in the flow chart of the transmission control sequence routine shown in FIG. 9, the following description is directed only to steps S4 through S9. That is, determinations are made at steps S4 through S6 as to whether the longitudinal acceleration Gx is greater than an upper critical longitudinal acceleration Gx1, less than the upper critical longitudinal acceleration Gx1 but greater than a lower critical longitudinal acceleration Gx2, or less than the lower critical longitudinal acceleration Gx2, respectively. If the longitudinal acceleration Gx is greater than the upper critical longitudinal acceleration Gx1, the gear ratio control map D is selected at step S7. If the longitudinal acceleration Gx is between the upper and lower critical longitudinal acceleration Gx1 and Gx2, the gear ratio control map C is selected at step S8. Further, if the longitudinal acceleration Gx is less than the lower critical longitudinal acceleration Gx2, the gear ratio control map B is selected at step S9. Through this automatic selection of the gear ratio control maps B, C and D, the step-wise control zone Z1 is altered to be narrower with an increase in the longitudinal acceleration Gx which also provides aggravation of driving stability.

In this variation where road surface frictional coefficients μ are examined to judge the stability of driving conditions as the longitudinal acceleration Gx becomes greater beyond the critical longitudinal acceleration Gx1 and Gx2 with the result of aggravation of the stability of driving, the step-wise control zone Z1 is altered to be narrower, and the continuous control zone Z2 is conversely altered to be wider. Consequently, a zone of driving conditions where the gear ratio is changed by repeating an alternate gradual increase and rapid decrease in engine speed N is narrowed for smaller longitudinal acceleration Gx, and a zone of driving conditions where the gear ratio is continuously changed at a fixed rate is broadened for greater longitudinal acceleration Gx. As a result, sporting and lively driving is realized as well as stable driving. In particular, because shift shock during sharp deceleration is suppressed, an appropriate engine braking effect is created, yielding improved pleasant driving.

Although, in the transmission control system of the above embodiment, the step-wise control zone Z1 is altered in three steps according to road slope angles θ examined by using the upper and lower critical angles θ1 and θ2, it may be altered in two steps according to road slope angles θ, steering angles φ, road surface frictional coefficients μ, or longitudinal acceleration Gx examined by using only one critical value. Alternatively, when the control parameters are larger than the respective upper critical values, the step-wise changes in transmission gear ratio may be prohibited by selecting the gear ratio control map E in which no step-wise control zone is defined.

Figure 20:
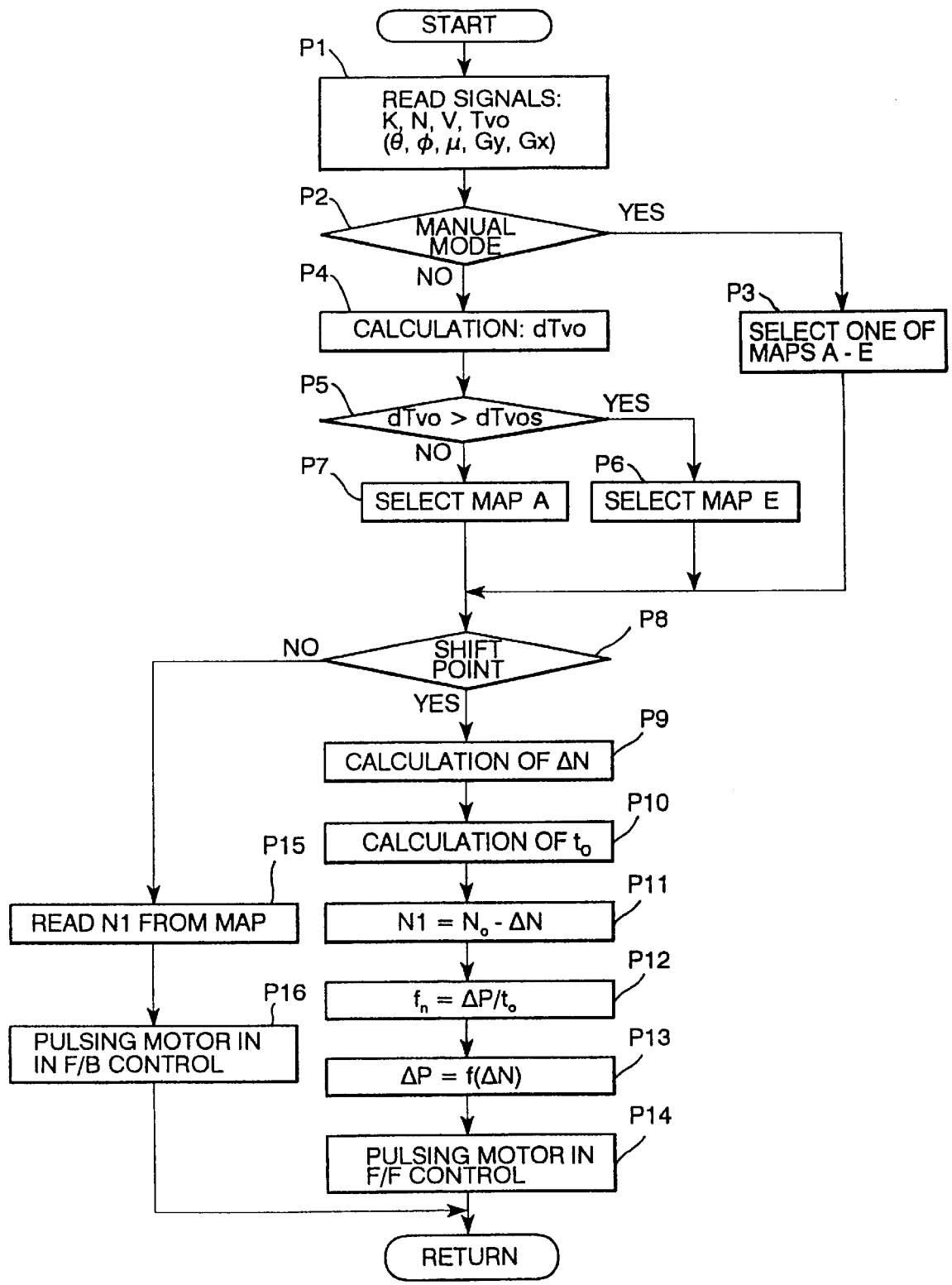
FIG. 20 is a flow chart illustrating a gear ratio control sequence routine for a microcomputer of a control unit of a transmission control system for a toroidal type continuously variable transmission in accordance with another specific embodiment of the invention.

FIG. 20 shows a flow chart illustrating the transmission control sequence routine for a control unit 21 of the transmission control system in accordance with another embodiment of the invention in which a step-wise gear ratio control map A (FIG. 4) and a continuous gear ratio control map E (FIG. 8) are selectively used in the automatic select mode to change the step-wise control zone Z1 to be narrower according to throttle opening changing rates dTvo. Since steps P8 through P16 in the flow chart of the transmission control sequence routine shown in FIG. 20 are just the same as steps S10 through S18 in the flow chart of the transmission control sequence routine shown in FIG. 9, respectively, the following description is directed only to steps P1 through P7.

The flow chart logic commences and control passes directly to function block at step P1 where various control parameters such as engine speed N, vehicle speed V, engine throttle opening Tvo, longitudinal acceleration Gx, lateral acceleration Gy, steering angle φ, road surface frictional coefficient $\mu$ and road slope angle θ are read into the control unit 21 based on signals from the sensors and switches 25–31. Further, at step P1, a signal K is read in if the manual select switch 31 is operated. A determination is made at step P2 as to whether a manual select mode in which the gear ratio control maps A through E are manually selected at step P3 has been set. If the select mode has not been set to the manual select mode but to an automatic select mode, after a calculation of a throttle opening changing rate dTvo at step P4, a determination is made at step P5 as to whether the throttle opening changing rates dTvo is greater than a critical changing rate dTvos. If the answer to the determination is affirmative, the continuous gear ratio control map E is selected at step P6. On the other hand, if the answer to the determination is negative, the step-wise gear ratio control map A is selected at step P7.

Since slow acceleration is generally intended by a driver to control the speed of the driver's vehicle so as, for instance, to follow a vehicle traveling ahead the driver's vehicle, if the continuous gear ratio control map E is used to cause continuous changes in gear ratio, a great change in gear ratio will occur resulting even from slightly stepping on an acceleration pedal, disabling precise vehicle speed control. With the transmission control system described above, however, the step-wise gear ratio control map A is used whenever the throttle opening changing rates dTvo is smaller than the critical changing rate dTvos, providing easy and precise vehicle speed control even through slow acceleration.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A continuously variable transmission control system for controlling a gear ratio of a continuously variable transmission of a vehicle based on a gear ratio control map which defines an engine speed according to vehicle driving conditions, said continuously variable transmission control system comprising:

driving condition monitoring means for monitoring a driving condition of said vehicle;

a gear ratio control map which has a step-wise control zone of driving conditions where engine speed is controlled to repeat alternate gradual increase said rapid decrease with an increase in vehicle speed so as thereby to vary step-wise a gear ratio and a continuous control zone of driving conditions where engine speed is controlled to increase approximately linearly with an increase in vehicle speed so as thereby to continuously vary a gear ratio; and control means for judging whether said driving condition monitored by said driving condition monitoring means is within a specified unstable zone of driving conditions, and narrowing said step-wise control zone of driving conditions when said driving condition is judged to be within said specified unstable zone.

2. A continuously variable transmission control system as defined in claim 1, wherein said control means interrupts controlling a gear ratio of the continuously variable transmission based on said step-wise control zone of driving conditions of said gear ratio control map when said driving condition is judged to be within said specified unstable zone.

3. A continuously variable transmission control system as defined in claim 1, wherein said driving condition monitoring means monitors a slope of a road on which said vehicle is running as said driving condition, and said control means judges said driving condition to be within said specified unstable zone when said slope of a road is greater than a specified slope.

4. A continuously variable transmission control system as defined in claim 1, wherein said driving condition monitoring means monitors a steering angle of a steering wheel of said vehicle as said driving condition, and said control means judges said driving condition to be within said specified unstable zone when said steering angle is greater than a specified angle.

5. A continuously variable transmission control system as defined in claim 1, wherein said driving condition monitoring means monitors lateral acceleration of said vehicle as said driving condition, and said control means judges said driving condition to be within said specified unstable zone when said lateral acceleration is greater than a specified level.

6. A continuously variable transmission control system as defined in claim 1, wherein said driving condition monitoring means monitors a road surface frictional coefficient of a road on which said vehicle is running as said driving condition, and said control means judges said driving condition to be within said specified unstable zone when said road surface frictional coefficient is less than a specified level.

7. A continuously variable transmission control system as defined in claim 1, wherein said driving condition monitoring means monitors longitudinal acceleration of said vehicle as said driving condition, and said control means judges said driving condition to be within said specified unstable zone when said longitudinal acceleration is greater than a specified level.

8. A continuously variable transmission control system for controlling a gear ratio of a continuously variable transmission of a vehicle based on a gear ratio control map which defines an engine speed according to vehicle driving conditions, said continuously variable transmission control system comprising:

driving condition monitoring means for monitoring a driving condition of said vehicle;

a plurality of gear ratio control maps which have both a step-wise control zone of driving conditions where engine speed is controlled to repeat alternate gradual increase and rapid decrease with an increase in vehicle speed so as thereby to vary step-wise a gear ratio and a continuous control zone of driving conditions where engine speed is controlled to increase approximately linearly with an increase in vehicle speed so as thereby to continuously vary a gear ratio, said gear ratio control maps having different zone ratios of an extent of step-wise control relative to an extent of linear control; and control means for judging whether said driving condition monitored by said driving condition monitoring means is within a specified unstable zone of driving conditions, and selecting one of said gear ratio control maps that have a step-wise control zone having a smaller said zone ratio when said driving condition is judged to be within said specified unstable zone.

9. A continuously variable transmission control system as defined in claim 8, wherein said driving condition monitoring means monitors a slope of a road on which said vehicle is running as said driving condition, and said control means judges said driving condition to be within said specified unstable zone when said slope of a road is greater than a specified slope.

10. A continuously variable transmission control system as defined in claim 8, wherein said driving condition monitoring means monitors a steering angle of a steering wheel of said vehicle as said driving condition, and said control means judges said driving condition to be within said specified unstable zone when said steering angle is greater than a specified angle.

11. A continuously variable transmission control system as defined in claim 8, wherein said driving condition monitoring means monitors lateral acceleration of said vehicle as said driving condition, and said control means judges said driving condition to be within said specified unstable zone when said lateral acceleration is greater than a specified level.

12. A continuously variable transmission control system as defined in claim 8, wherein said driving condition monitoring means monitors a road surface frictional coefficient of a road on which said vehicle is running as said driving condition, and said control means judges said driving condition to be within said specified unstable zone when said road surface frictional coefficient is less than a specified level.

13. A continuously variable transmission control system as defined in claim 8, wherein said driving condition monitoring means monitors longitudinal acceleration of said vehicle as said driving condition, and said control means judges said driving condition to be within said specified unstable zone when said longitudinal acceleration is greater than a specified level.

14. A continuously variable transmission control system as defined in claim 8, wherein said gear ratio control maps have said step-wise control zones for engine throttle openings greater than different specified openings, respectively, and said control means selects one of said gear ratio control maps that has said step-wise control zone having a greater said specified opening when said driving condition is judged to be within said specified unstable zone.

15. A continuously variable transmission control system as defined in claim 8, wherein said control system includes a first gear ratio control map having at least said step-wise control zone and a second gear ratio control map having said continuous control zone only, and said control means selects said second gear ratio control map when said driving condition is judged to be within said specified unstable zone.

16. A continuously variable transmission control system for controlling a gear ratio of a continuously variable transmission of a vehicle based on a gear ratio control map which defines an engine speed according to vehicle driving conditions, said continuously variable transmission control system comprising:

driving condition monitoring means for monitoring an throttle opening of an engine throttle;

a step-wise gear ratio control map for controlling engine speed to increase with increases in vehicle speed and engine throttle opening so as thereby to step-wise vary a gear ratio;

a continuous gear ratio control map for controlling engine speed to increase with an increase in vehicle speed so as thereby to continuously vary a gear ratio; and control means for detecting a changing rate of said throttle opening, and selecting said step-wise gear ratio control map when said changing rate is equal to or less than a specified rate and said continuous gear ratio control map when said changing rate is greater than said specified rate.

17. A continuously variable transmission control system for controlling a gear ratio of a continuously variable transmission of a vehicle based on a gear ratio control map which defies an engine speed according to vehicle driving conditions, said continuously variable transmission control system comprising:

driving condition monitoring means for monitoring a driving condition of said vehicle;

a first gear ratio control map which has at least a step-wise control zone of driving condition where engine speed is controlled to repeat alternate gradual increase and rapid decrease with an increase in vehicle speed so as thereby to vary step-wise a gear ratio;

a second gear ratio control map which has a continuous control zone of driving conditions only where engine speed is controlled to increase approximately linearly with an increase in vehicle speed so as thereby to continuously vary a gear ratio; and control means for judging whether said driving condition monitored by said driving condition monitoring means is within a specified unstable zone of driving conditions, and select said second gear ratio control map when said driving condition is judged to be within said specified unstable zone.

18. A continuously variable transmission control system for controlling a gear ratio of a continuously variable transmission of a vehicle based on a gear ratio control map which defines an engine speed according to vehicle driving conditions, said continuously variable transmission control system comprising:

a road slope sensor for detecting a slope of a road on which said vehicle is running;

a plurality of gear ratio control maps which have at least either one of a step-wise control zone of driving conditions where engine speed is controlled to repeat alternate gradual increase and rapid decrease with an increase in vehicle speed so as thereby to vary step-wise a gear ratio and a continuous control zone of driving conditions where engine speed is controlled to increase approximately linearly with an increase in vehicle speed so as thereby to continuously vary a gear ratio, said gear ratio control maps having different zone ratios of an extent of step-wise control relative to an extent of linear control; and a control unit for judging a driving condition to be within a specified unstable zone of driving conditions when said road slope is greater than a specified slope, and selecting one of said gear ratio control maps that has a step-wise control zone having a smaller said zone ratio when said driving condition is judged to be within said specified unstable zone.

19. A continuously variable transmission control system for controlling a gear ratio of a continuously variable transmission of a vehicle based on a gear ratio control map which defines an engine speed according to vehicle driving conditions, said continuously variable transmission control system comprising:

a steering angle sensor for detecting a steering angle of a steering wheel of said vehicle;

a plurality of gear ratio control maps which have at least either one of a step-wise control zone of driving conditions wherein engine speed is controlled to repeat alternate gradual increase and rapid decrease with an increase in vehicle speed so as thereby to vary step-wise a gear ratio and a continuous control zone of driving conditions where engine speed is controlled to increase approximately linearly with an increase in vehicle speed so as thereby to continuously vary a gear ratio, said gear ratio control maps having different zone ratios of an extent of step-wise control relative to an extent of linear control; and a control unit for judging a driving condition to be within a specified unstable zone of driving conditions when said steering angle is greater than a specified angle, and selecting one of said gear ratio control maps that has a step-wise control zone having a smaller said zone ratio when said driving condition is judged to be within said specified unstable zone.

20. A continuously variable transmission control system for controlling a gear ratio of a continuously variable transmission of a vehicle based on a gear ratio control map which defines an engine speed according to vehicle driving conditions, said continuously variable transmission control system comprising:

an acceleration sensor for detecting a lateral acceleration of said vehicle;

a plurality of gear ratio control maps which have at least either one of a step-wise control zone of driving conditions where engine speed is controlled to repeat alternate gradual increase and rapid decrease with an increase in vehicle speed so as thereby to vary step-wise a gear ratio and a continuous control zone of driving conditions where engine speed is controlled to increase approximately linearly with an increase in vehicle speed so as thereby to continuously vary a gear ratio, said gear ratio control maps having different zone ratios of an extent of step-wise control relative to an extent of linear control; and a control unit for judging a driving condition to be within a specified unstable zone of driving conditions when said lateral acceleration is greater than a specified level, and selecting one of said gear ratio control maps that has a step-wise control zone having a smaller said zone ratio when said driving condition is judged to be within said specified unstable zone.

21. A continuously variable transmission control system for controlling a gear ratio of a continuously variable transmission of a vehicle based on a gear ratio control map which defines an engine speed according to vehicle driving conditions, said continuously variable transmission control system comprising:

a friction sensor for detecting a road surface friction coefficient of a road on which said vehicle is running;

a plurality of gear ratio control maps which have at least either one of a step-wise control zone of driving conditions where engine speed is controlled to repeat alternate gradual increase and rapid decrease with an increase in vehicle speed so as thereby to vary step-wise a gear ratio and a continuous control zone of driving conditions where engine speed is controlled to increase approximately linearly with an increase in vehicle speed so as thereby to continuously vary a gear ratio, said gear ratio control maps having different zone ratios of an extent of step-wise control relative to an extent of linear control; and a control unit for judging a driving condition to be within a specified unstable zone of driving conditions when said road surface friction coefficient is less than a specified level, and selecting one of said gear ratio control maps that has a step-wise control zone having a smaller said zone ratio when said driving condition is judged to be within said specified unstable zone.

22. A continuously variable transmission control system for controlling a gear ratio of a continuously variable transmission of a vehicle based on a gear ratio control map which defines an engine speed according to vehicle driving conditions, said continuously variable transmission control system comprising:

an acceleration sensor for detecting a longitudinal acceleration of said vehicle;

a plurality of gear ratio control maps which have at least either one of a step-wise control zone of driving conditions where engine speed is controlled to repeat alternate gradual increase and rapid decrease with an increase in vehicle speed so as thereby to vary step-wise a gear ratio and a continuous control zone of driving conditions where engine speed is controlled to increase approximately linearly with an increase in vehicle speed so as thereby to continuously vary a gear ratio, said gear ratio control maps having different zone ratios of an extent of step-wise control relative to an extent of linear control; and a control unit for judging a driving condition to be within a specified unstable zone of driving conditions when said longitudinal acceleration is greater than a specified level, and selecting one of said gear ratio control maps that has a step-wise control zone having a smaller said zone ratio when said driving condition is judged to be within said specified unstable zone.

23. A continuously variable transmission control system for controlling a gear ratio of a continuously variable transmission of a vehicle based on a gear ratio control map which defines an engine speed according to vehicle driving conditions, said continuously variable transmission control system comprising:

a throttle position sensor for detecting a throttle opening of an engine throttle;

a step-wise gear ratio control map for controlling engine speed to increase with increases in vehicle speed and engine throttle opening so as thereby to step-wise vary a gear ratio;

a continuous gear ratio control map for controlling engine speed to increase with an increase in vehicle speed so as thereby to continuously vary a gear ratio; and a control unit for detecting a changing rate of said throttle opening, and selecting said step-wise gear ratio control map when said changing rate is equal to or less than a specified rate and said continuous gear ratio control map when said changing rate is greater than said specified rate.

* * * * *